(12) United States Patent
Zhao et al.

(10) Patent No.: US 9,717,083 B2
(45) Date of Patent: *Jul. 25, 2017

(54) METHOD AND DEVICE FOR ALLOCATING DEDICATED SCHEDULING REQUEST RESOURCE

(71) Applicant: China Academy of Telecommunications Technology, Beijing (CN)

(72) Inventors: Yali Zhao, Beijing (CN); Guoqing Li, Beijing (CN)

(73) Assignee: CHINA ACADEMY OF TELECOMMUNICATIONS, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,173

(22) Filed: Dec. 14, 2015

(65) Prior Publication Data

US 2016/0100389 A1    Apr. 7, 2016

Related U.S. Application Data

(63) Continuation of application No. 13/266,886, filed as application No. PCT/CN2010/072318 on Apr. 29, 2010, now Pat. No. 9,270,424.

(30) Foreign Application Priority Data

Apr. 30, 2009   (CN) .......................... 2009 1 0083408
Apr. 28, 2010   (CN) .......................... 2010 1 0158488

(51) Int. Cl.
*H04L 12/28*       (2006.01)
*H04W 72/04*       (2009.01)
*H04L 5/00*        (2006.01)
*H04W 72/12*       (2009.01)
*H04J 1/16*        (2006.01)

(52) U.S. Cl.
CPC ........ *H04W 72/044* (2013.01); *H04L 5/0007* (2013.01); *H04L 5/0091* (2013.01); *H04L 5/0094* (2013.01); *H04W 72/1284* (2013.01); *H04W 72/1289* (2013.01)

(58) Field of Classification Search
USPC ................................ 370/252, 329, 430, 478
See application file for complete search history.

(56) References Cited

U.S. PATENT DOCUMENTS

2011/0292854 A1*  12/2011  Terry ..................... H04L 5/001
                                                        370/311
2016/0165610 A1*   6/2016  Chung ................. H04J 11/0069
                                                        370/329

* cited by examiner

*Primary Examiner* — John Pezzlo
(74) *Attorney, Agent, or Firm* — Fay Kaplun & Marcin, LLP

(57) ABSTRACT

A method and device for distributing the specific scheduling request resources. The method includes: in the multi-carrier aggregation system, according to the set scheduling principle determine the terminal sending carrier resources which may be used by the specific scheduling, the carrier resources comprises the number of carrier and serial number, the carrier resources of the specific scheduling request resources are distributed and sent to the terminal on the determined carrier according to the set scheduling principle; the distributed carrier and time frequency resources which may be used on every carrier are informed to the terminal.

8 Claims, 7 Drawing Sheets

METHOD AND DEVICE FOR ALLOCATING DEDICATED SCHEDULING REQUEST RESOURCE

PRIORITY CLAIM

The present application is a Continuation of U.S. patent application Ser. No. 13/266,886, which is the US National Stage of International Application Serial No. PCT/CN2010/072318, filed 29 Apr. 2010, designating the United States, and claiming priorities to Chinese Patent Application Serial Nos. 200910083408.9 filed 30 Apr. 2009 and 201010158488.2 filed 28 Apr. 2010.

FIELD OF THE INVENTION

The present invention relates to the field of communications and particularly to a method and device for allocating a dedicated scheduling request resource.

BACKGROUND OF THE INVENTION

The Long Term Evolution (LTE)/Long Term Evolution-Advanced (LTE-A) system is a scheduling-based communication system, that is, if there is data to be transmitted in the transmission buffer of a User Equipment (UE), the UE firstly transmits a Buffer Status Report (BSR) to a base station to notify the base station of information of the data to be transmitted in the transmission buffer of the UE. Upon reception of the BSR transmitted from the UE, the base station will allocate the related Uplink-Shared Channel (UL-SCH) resource to the UE according to the amount of the data to be transmitted of the UE and the service type and instruct the UE to transmit the data on the allocated UL-SCH resource.

The UE transmits the BSR to the base station also on the Uplink-Shared Channel (UL-SCH) resource, and if there is a BSR to be transmitted but no uplink-shared channel resource is available, a Scheduling Request will be triggered to request the base station to allocate an uplink-shared channel resource for the BSR to be transmitted.

After the SR is triggered, the SR may be transmitted in either of two ways, i.e., the SR is transmitted on a Dedicated Scheduling Request (D-SR) resource or in a Random Access procedure (RA-SR). When the UE and the base station are synchronized, there may be no available D-SR resource, and when they are unsynchronized, there must be no D-SR resource. D-SR resource is allocated by RRC signaling and transmits on Physical Uplink Control Channel (PUCCH).

Generally, an SR is transmitted under such a fundamental principle that no RA-SR will be used so long as the D-SR resource is available. And the SR can be transmitted repeatedly on the D-SR resource until the UE gets the uplink-shared channel resource allocated by the base station.

In the LTE system, an uplink dedicated scheduling request is transmitted on PUCCH according to PUCCH format1/1a/1b for which a symbol is spread in the frequency domain by being multiplied with a 12-bit cyclic shift sequence to form a 12-bit sequence of symbols, which is in turn spread in the time domain by being multiplied with a 4-bit orthogonal sequence and mapped onto 12×4 time and frequency locations of a Physical Resource Block (PRB) on a timeslot, where three symbols are used for transmission of a Reference Signal (RS), and different users borne on the same PRB are distinguished with different cyclic shift values for a fundamental sequence.

In the system, a part of the PUCCH resource is typically reserved for each subframe as a cell-specific SR resource so that the PUCCH resource is shared amongst UEs in the cell and the base station allocates the cell-specific SR resource to the UEs in the cell according to a specific resource allocation strategy and notifies the D-SR PUCCH resource index, period and subframe offset to the UE by RRC signaling. The meanings of parameters in the RRC signaling are depicted in Table 1, where the RRC signaling includes sr-PUCCH-ResourceIndex, sr-ConfigurationIndex and dsr-TransMax, with their meanings as depicted in the table.

TABLE 1

| Parameter | The Meaning of Parameter |
| --- | --- |
| sr-PUCCH-ResourceIndex | This parameter designates a resource index of a PUCCH resource in a subframe, which is allocated to the UE for transmission of a D-SR. |
| sr-ConfigurationIndex | This parameter represents the period and subframe offset by which a D-SR is transmitted, UE can determine its D-SR resource according to this parameter and the starting subframe of the D-SR resource. |
| dsr-TransMax | This parameter represents the maximum number of transmissions that a D-SR can be transmitted, and the purpose of introducing this parameter is to improve the reliability of the D-SR. |

The peak rates of the LTE-A are significantly increased compared with the LTE system, and 1 Gbps in the downlink and 500 Mbps in the uplink are required. Also the LTE-A system is required to be well compatible with the LTE system. Carrier Aggregation (CA) has been introduced to the LTE-A system in order to reach the increased peak rates, compatible with the LTE system and full use of the spectrum resource.

Carrier aggregation means that UE can aggregate more than one cell simultaneously, which is different from the legacy radio systems who can only aggregate one cell at a time. In a system supporting carrier aggregation, component carriers may or may not be continuous, and for compatibility with the LTE system, the maximum bandwidth of each component carriers is 20 MHz, and the bandwidths of different component carriers may be same or not.

As for the definition of a primary carrier, a plurality of component carriers may be supported in the uplink in the LTE-A system, and there is no definite concept of a primary carrier so far, which may be cell-specific or UE-specific. If the primary carrier is cell-specific, the primary carrier has to be supported by all of the R10 UEs; and if the primary carrier is UE-specific, the UE has to support its own primary carrier.

With the introduction of CA, a plurality of component carriers have to be supported concurrently in the uplink, so how to configure a UE-specific D-SR resource shall be taken into account in the case of a plurality of component carriers, but a relevant description is absent in the existing standards.

SUMMARY OF THE INVENTION

The invention provides a method and device for allocating a dedicated scheduling request source to configure a UE-specific D-SR resource.

A method for allocating a dedicated scheduling request source according to an embodiment of the invention includes:

configuring a carrier resource in a system supporting carrier aggregation for a user equipment according to a preset scheduling criterion, and allocating corresponding time and frequency resources on the configured carrier resource, wherein the carrier resource together with the time and frequency resources are regarded as a dedicated scheduling request resource; and notifying the user equipment of the carrier resource and/or the time and frequency resources.

A device for allocating a dedicated scheduling request source according to an embodiment of the invention includes:

a resource allocation unit configured to configure a carrier resource for a user equipment according to a preset scheduling criterion, and allocate corresponding time and frequency resources on the configured carrier resource, wherein the carrier resource together with the time and frequency resources are regarded as a dedicated scheduling request resource; and a notification unit configured to notify the user equipment of the carrier resource and/or the time and frequency resources.

A method for transmitting a dedicated scheduling request according to an embodiment of the invention includes:

receiving, by a user equipment in a system supporting carrier aggregation, carrier information and corresponding time and frequency resources information of a dedicated scheduling request resource transmitted from a base station; and transmitting a dedicated scheduling request on the corresponding time and frequency resources on the carrier designated by the base station.

A user equipment according to an embodiment of the invention includes:

a reception unit configured to receive carrier information and corresponding time and frequency resources information of a dedicated scheduling request resource transmitted from a base station; and a dedicated scheduling request transmission unit configured to transmit a dedicated scheduling request on the corresponding time and frequencies on the carrier designated by the base station.

In the embodiments of the invention, in a system supporting carrier aggregation, a carrier resource is chosen for a user equipment as a dedicated scheduling request resource of the user equipment according to a preset scheduling criterion, and time and frequency resources on the chosen uplink component carrier are also allocated for the dedicated scheduling request; and the user equipment is notified of the carrier resource and/or the time and frequency resources, thereby configuring in the system supporting carrier aggregation the time and frequency resources for a dedicated scheduling request of the user equipment.

DETAILED DESCRIPTION OF THE EMBODIMENTS

In embodiments of the invention, in a system supporting carrier aggregation, a carrier resource is configured for a user equipment according to a preset scheduling criterion, and time and frequency resources are allocated on the configured carrier resource, where the carrier resource and the time and frequency resources are regarded as a dedicated scheduling request resource; and the user equipment is notified of the carrier resource and/or the time and frequency resources.

Figure 1:
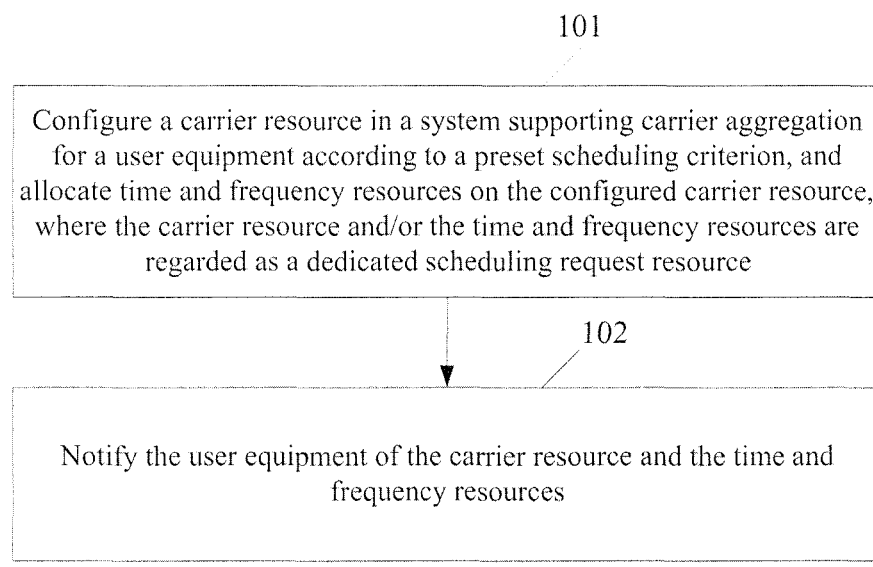
FIG. 1 is a schematic flow chart of a method for allocating a dedicated scheduling request resource according to an embodiment of the invention.

Referring to FIG. 1, a method according to an embodiment of the invention includes the following steps.

In a step 101, in a system supporting carrier aggregation, a carrier resource is configured for a user equipment according to a preset scheduling criterion, and time and frequency resources are allocated on the configured carrier resource, where the carrier resource and/or the time and frequency resources are regarded as a dedicated scheduling request resource.

Here a carrier resource may be chosen for the user equipment according to a preset scheduling criterion as follows: a carrier resource may be chosen randomly according to UE capability information of the user equipment, a carrier resource may be chosen according to a load balance criterion, or a primary carrier may be chosen as a dedicated scheduling request resource of the user equipment. The chosen carrier resource may include one or more uplink component carriers.

The dedicated scheduling request resource may include information on time and frequency resources of one uplink component carrier allocated to the user equipment at any moment of time or information on time and frequency resources of a plurality of uplink component carriers allocated for the user equipment at any preset moment of time.

When a plurality of uplink component carriers are chosen, the user equipment may be configured to transmit a dedicated scheduling request on each of the uplink component carriers, or the user equipment may be configured to transmit a dedicated scheduling request on only one uplink component carrier in one subframe and the chosen uplink component carriers can be used in turn at different subframes.

In a step 102, the user equipment is notified of the carrier resource and/or the time and frequency resources.

Implementation solutions of the invention are detailed below in connection with embodiments thereof.

Figure 2:
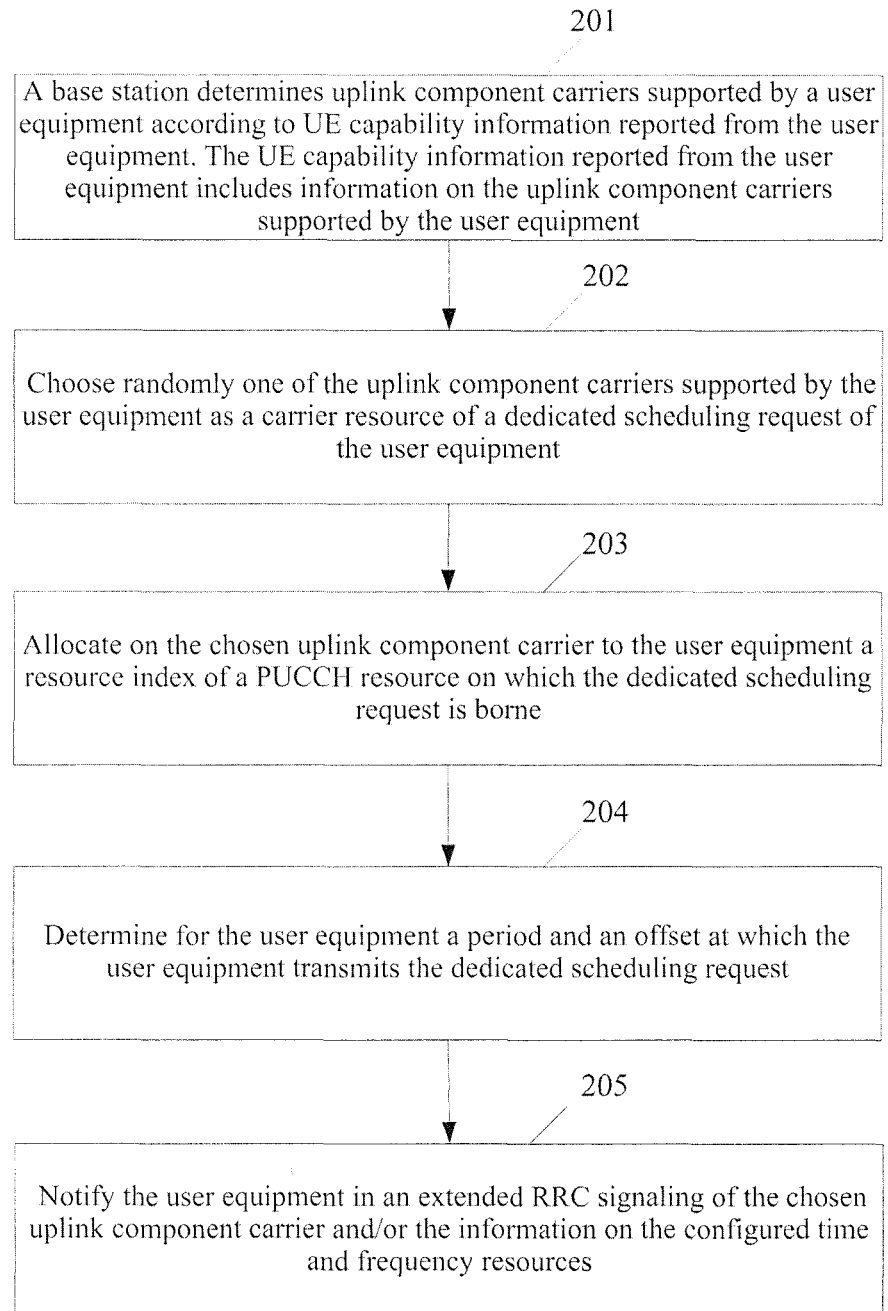
FIG. 2 is a schematic flow chart of a first embodiment of allocating a dedicated scheduling request resource according to the invention.

Reference is made to FIG. 2 illustrating such an implementation solution that a base station chooses an uplink component carrier according to the capability of the user equipment in the present embodiment as follows.

In a step 201, a base station determines uplink component carriers supported by the user equipment according to capability information reported from the user equipment. The capability information reported from the user equipment includes information of the uplink component carriers supported by the user equipment.

In a step 202, one uplink component carrier is chosen randomly from the uplink component carriers supported by the user equipment as a carrier resource of a dedicated scheduling request of the user equipment.

In a step 203, a resource index of a PUCCH resource on which the dedicated scheduling request is borne is allocated on the chosen uplink component carrier to the user equipment.

In a step 204, a period and an offset at which the user equipment transmits the dedicated scheduling request are determined for the user equipment. The resource index of the PUCCH resource allocated in the step 203 and the period and offset determined in the step 204 are used as information on time and frequency resources configured for the user equipment.

In a step 205, the user equipment is notified in an extended RRC signaling of the chosen uplink component carrier and/or the information on the configured time and frequency resources.

A component carrier indication field may be added to an existing RRC signaling so that the extended RRC signaling includes a frequency resource indication field and a time-frequency resource indication filed, and the frequency resource indication field is used to store the carrier information for the dedicated scheduling request, and the time-frequency resource indication filed is used to store the time and frequency resources for the dedicated scheduling request. The time and frequency resources include the resource index of the PUCCH resource, the period and offset for the dedicated scheduling request. The carrier information includes the index of the carrier on which the dedicated scheduling request is transmitted or the frequency of the uplink component carrier. Furthermore, the RRC signaling may include the maximum number of transmissions that the dedicated scheduling request can be transmitted.

For example, the extended RRC signaling is depicted in Table 2. Referring to Table 2, in an embodiment of the invention, a parameter, i.e., an index of a UE-specific D-SR resource (sr-Componentcarrier), can be added optionally compared with the SR configuration information elements in the protocol of LTE Release 8 (R8), so that the extended RRC signaling includes at least the UE-specific D-SR resource index (sr-Componentcarrier), and the period and offset (sr-ConfigurationIndex). Where sr-Componentcarrier represents the component carrier index assigned for the D-SR, sr-ConfigurationIndex represents the period and the subframe offset for transmission of a D-SR. The specific subframe in which a UE transmits a D-SR can be determined according to the parameter of sr-ConfigurationIndex and the starting subframe of a configured D-SR resource.

The RRC signaling may further include dsr-TransMax, which represents the maximum number of transmissions that a D-SR can be transmitted, and the purpose of this parameter is to improve the reliability of the D-SR.

It shall be noted that if the chosen carrier resource is the primary carrier, information indicating the carrier may not be carried in RRC signaling.

TABLE 2

| Parameter | The Meaning of Parameter |
|---|---|
| sr-PUCCH-ResourceIndex | The parameter designates a resource index of a PUCCH resource in a subframe, which is allocated to the UE for transmission of a D-SR. |
| sr-ConfigurationIndex | The parameter represents a period and a subframe offset at which a D-SR is transmitted, and a specific subframe in which the UE transmits a D-SR may be determined according to the parameter and a starting subframe of a configured D-SR resource. |
| dsr-TransMax | The parameter represents the maximum number of times that a D-SR is transmitted, and the purpose of the parameter is to improve the reliability of the D-SR. |
| sr-Componentcarrier | The parameter designates an index of a component carrier for an SR. |
| . . . | . . . |

Figure 3:
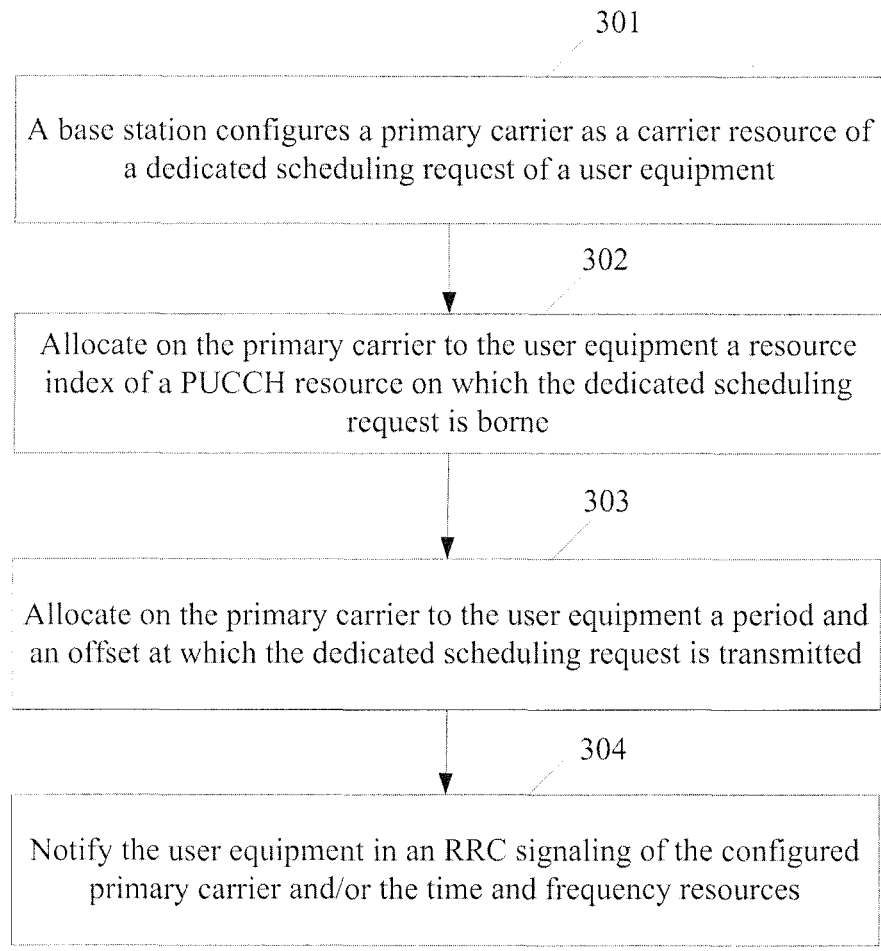
FIG. 3 is a schematic flow chart of a second embodiment of allocating a dedicated scheduling request resource according to the invention.

Reference is made to FIG. 3 illustrating an example in which a primary carrier is configured as a dedicated scheduling request resource of a user equipment in the present embodiment particularly as follows.

In a step 301, a base station configures a primary carrier as a carrier resource of a dedicated scheduling request of a user equipment.

If the uplink primary carrier is UE-specific, the base station may determine it per UE and use it as the D-SR sending carrier for this UE. If the uplink primary carrier is cell-specific, the eNB can assign the cell-specific primary carrier as the UE-specific dedicated scheduling resource.

In a step 302, a resource index of a PUCCH resource used for carrying dedicated scheduling request will be allocated to the user equipment on the primary carrier.

In a step 303, the period and offset used to carry the dedicated scheduling request will be determined for the user equipment.

The allocated resource index of the PUCCH resource together with the determined period and offset can be used to deduce the time and frequency resources for transmitting the dedicated scheduling request for this user equipment.

In a step 304, the user equipment is notified by an RRC signaling to inform the configured primary cell and/or the time and frequency resources for transmitting the dedicated scheduling request.

If UE already knows which uplink component carrier is the primary carrier, the RRC signaling can only carry the UE-specific D-SR resource index, period and subframe offset. The current RRC signaling is enough, not need to be extended.

Figure 4:
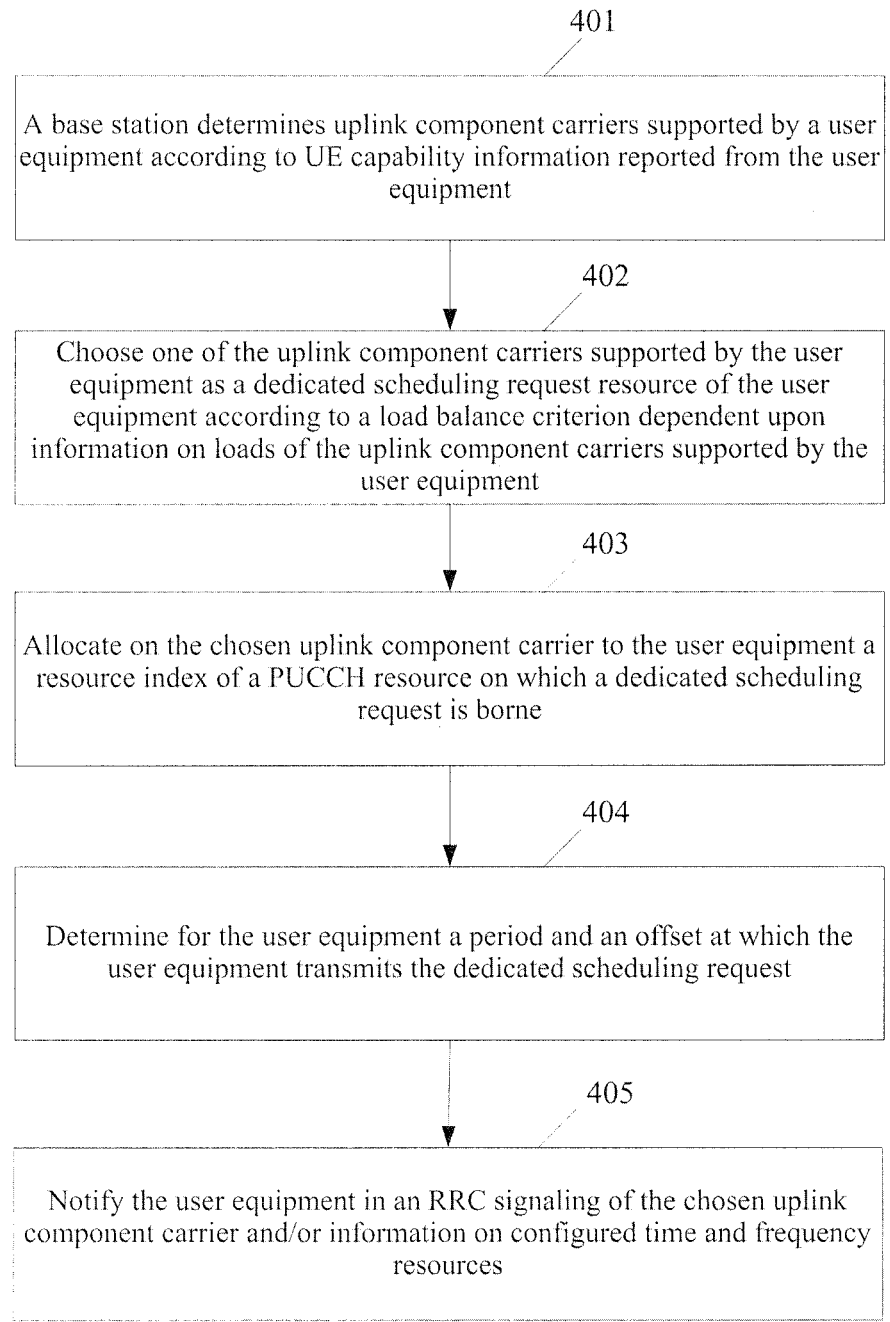
FIG. 4 is a schematic flow chart of a third embodiment of allocating a dedicated scheduling request resource according to the invention.

Reference is made to FIG. 4 illustrating such a solution of the invention that a carrier resource is chosen according to a load balance criterion in the present embodiment will be described by way of an example particularly as follows.

In a step 401, a base station determines uplink component carriers supported by the user equipment according to capability information reported from the user equipment.

In a step 402, one uplink component carrier is chosen from the uplink component carriers supported by the user equipment as a dedicated scheduling request resource of the user equipment according to a load balance criterion dependent upon information on loads of the uplink component carriers supported by the user equipment.

In a step 403, a resource index of a PUCCH resource on which a dedicated scheduling request is borne is allocated on the chosen uplink component carrier to the user equipment.

In a step 404, a period and an offset at which the user equipment transmits the dedicated scheduling request are determined for the user equipment, that is, a specific subframe is configured in which the user equipment transmits the dedicated scheduling request on the chosen uplink component carrier.

In a step 405, the user equipment is notified in an RRC signaling of the chosen uplink component carrier and/or information on configured time and frequency resources.

A component carrier indication field may be added into an existing RRC signaling as in the embodiment illustrated in FIG. 2, and reference may be made to Table 2 for details thereof.

Figure 5:
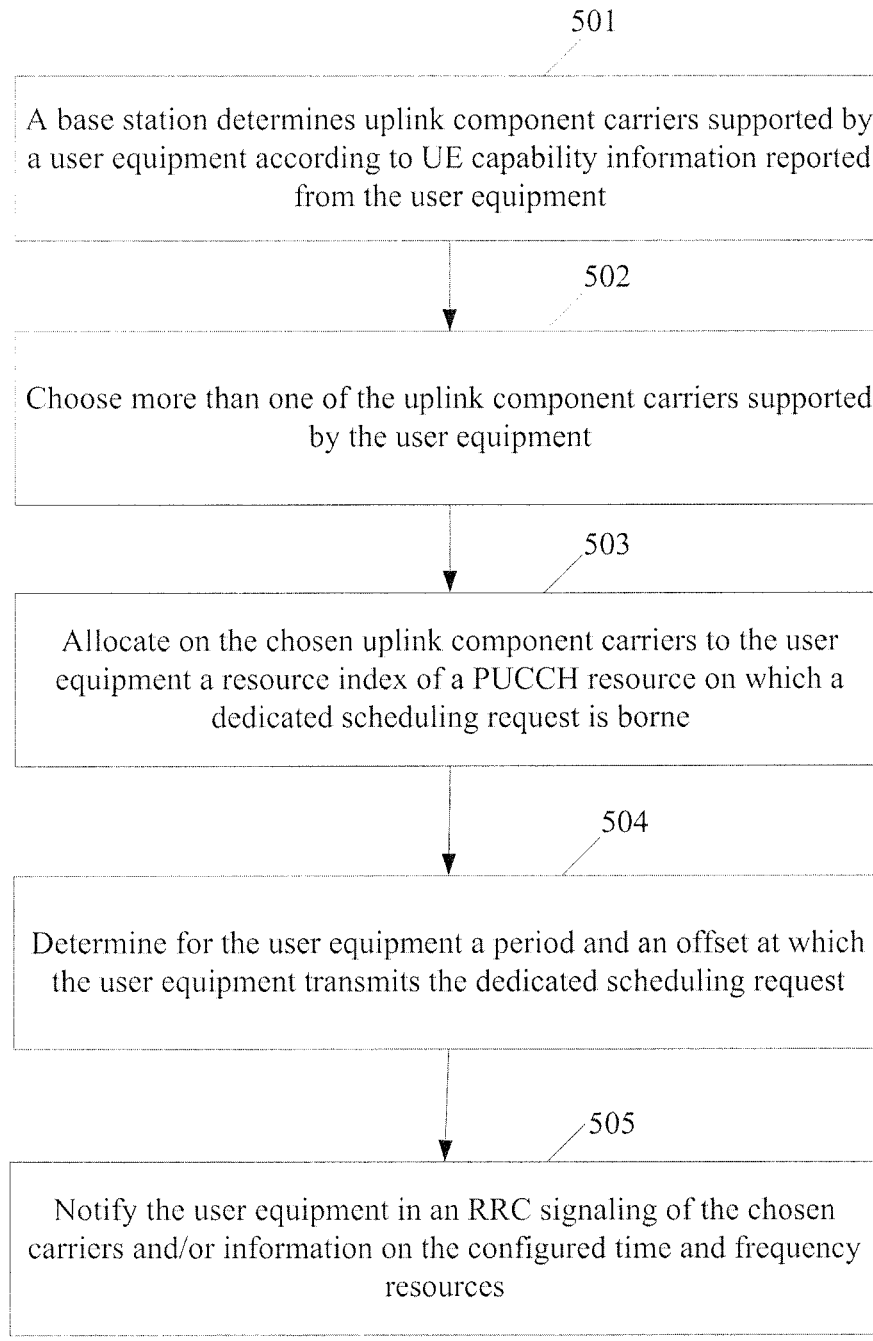
FIG. 5 is a schematic flow chart of a fourth embodiment of allocating a dedicated scheduling request resource according to the invention.

Reference is made to FIG. 5 illustrating such a solution of the invention that a dedicated scheduling request resource is allocated in a frequency-hopping mode in the present embodiment will be described by way of an example. In the present embodiment, a dedicated scheduling request may be hopped in frequency in a group of a part or all of uplink component carriers in a temporal order of subframes, but a dedicated scheduling request resource can be allocated on only one uplink component carrier in a subframe.

In a step 501, a base station determines uplink component carriers supported by a user equipment according to capability information reported from the user equipment.

In a step 502, more than one uplink component carriers are chosen from the uplink component carriers supported by the user equipment.

In a step 503, a resource index of a PUCCH resource on which a dedicated scheduling request is borne is allocated on the chosen uplink component carriers to the user equipment.

In a step 504, a period and an offset at which the user equipment transmits the dedicated scheduling request are determined for the user equipment.

The resource index of the PUCCH resource allocated in the step 503 and the period and offset determined in the step 504 are used as information on time and frequency resources configured for the user equipment.

For example, the base station chooses a number N of ones from the uplink component carriers supported by the UE, where N is larger than one and smaller than or equal to the number of uplink component carriers supported by the UE, and determines a carrier allocating in a subframe an SR resource according to such a criterion that only one component carrier is used in a subframe and switching is performed between the component carriers in the different subframes.

Figure 6:
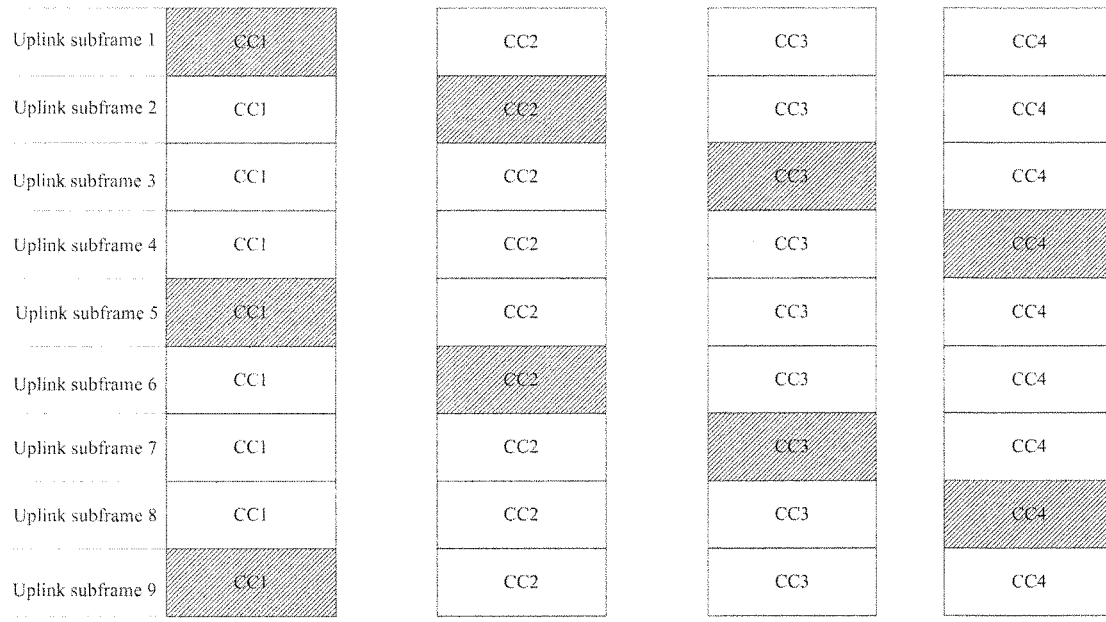
FIG. 6 is a schematic diagram of switching a dedicated scheduling request resource on different uplink component carriers at different moments of time in the embodiment illustrated in FIG. 5.

Referring to FIG. 6, the base station chooses four uplink component carriers, e.g., CC1, CC2, CC3 and CC4, as a dedicated scheduling request resource, and configures CC1 with subframes of an uplink subframe 1, an uplink subframe 5 and an uplink subframe 9, configures CC2 with subframes of an uplink subframe 2 and an uplink subframe 6, configures CC3 with subframes of an uplink subframe 3 and an uplink subframe 7 and configures CC4 with subframes of an uplink subframe 4 and an uplink subframe 8.

That is, the user equipment may transmit a dedicated scheduling request on CC1 in the uplink subframes 1, 5 and 9, on CC2 in the uplink subframes 2 and 6 and on CC3 in the uplink subframes 3 and 7 according to the foregoing configuration.

In a step 505, the user equipment is notified in an RRC signaling of the chosen carriers and/or information on the configured time and frequency resources. Stated otherwise, the base station notifies in an RRC signaling the location, period and offset of the UE-specific D-SR resource.

Referring to Table 3, an existing RRC signaling may be extended in the present embodiment so that the extended RRC signaling includes a frequency-hopping mode indication (hopping-mode) field and a group of hop component carriers indication (cc-group) field, where the group of hop component carriers indication field is used to store a group of hop component carriers of the user equipment, and the frequency-hopping mode indication field is used to store time and frequency information corresponding to each of the carriers in the group of hop component carriers. The carrier information includes the indexes of the carriers of the dedicated scheduling request resource or information on frequency points of the uplink component carriers as the dedicated scheduling request resource of the user equipment. Of course, the frequency-hopping mode indication field may be omitted if there is only one predefined hopping mode.

TABLE 3

| Parameter | The Meaning of Parameter |
| --- | --- |
| cc-group | The parameter represents a group of CCs participating in transmitting SR information of the UE |
| hopping-mode | The parameter indicates an SR hopping mode, i.e., offsets and periods on each of the CCs |

Figure 7:
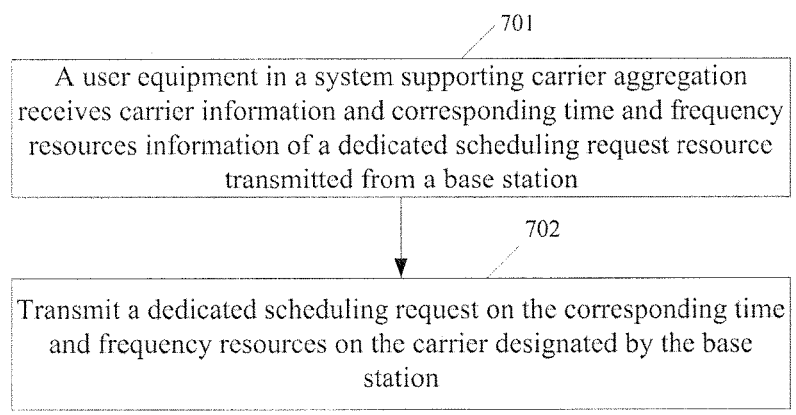
FIG. 7 is a schematic flow chart of a method for transmitting a dedicated scheduling request according to an embodiment of the invention.

Referring to FIG. 7, a method for transmitting a dedicated scheduling request according to another embodiment of the invention includes the following steps.

In a step 701, in a system supporting carrier aggregation, a user equipment receives carrier information and information on time and frequency resources on each carrier of a dedicated scheduling request resource transmitted from a base station.

In a step 702, a dedicated scheduling request is transmitted on the corresponding time and frequency resources on the carrier designated by the base station.

If the user equipment receives an RRC signaling transmitted from the base station in the step 701, which includes a frequency resource indication field and/or a time and frequency resource indication field, where the time and frequency resource indication field indicates information on the time and frequency resources on which the dedicated scheduling request is transmitted, and the information on the time and frequency resources includes a resource index of a PUCCH resource, period and offset for the dedicated scheduling request.

Furthermore, the RRC signaling may include the maximum number of times that the dedicated scheduling request is transmitted.

Then in the step 702, the time and frequency resources used for transmitting dedicated scheduling request can be deduced from the D-SR starting subframe and the period and subframe offset in the time and frequency resource indication field. And then can use the carrier resource indicated in the frequency resource indication field to send the dedicated scheduling request.

If the user equipment receives an RRC signaling transmitted from the base station in the step 701, which includes a frequency-hopping mode indication field and a group of hop component carries indication field, where the group of hop component carriers indication field is used to store a group of hop component carriers of the user equipment, and the frequency-hopping mode indication field is used to store an offset and a period of a subframe on each carrier in the group of hop component carriers.

Then in the step 702, the dedicated scheduling request may be transmitted on the corresponding time and frequency resources on an uplink component carrier in the group of hop component carriers in the RRC signaling, and frequency-hopping may be performed in the time and frequency resources indicated in the frequency-hopping mode indication field.

Figure 8:
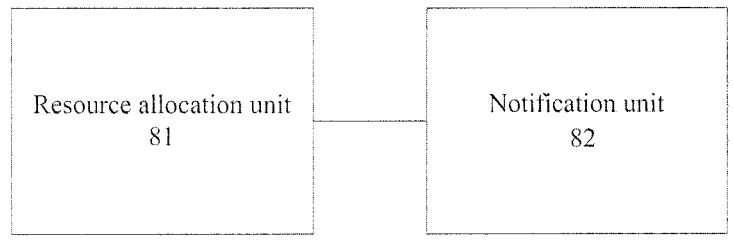
FIG. 8 is a schematic structural diagram of a device for allocating a dedicated scheduling request resource according to an embodiment of the invention.

Referring to FIG. 8, a device for allocating a dedicated scheduling request resource according to an embodiment of the invention includes:

a resource allocation unit 81 configured to configure a carrier resource for a user equipment according to a preset scheduling criterion, and allocate time and frequency resources on the configured carrier resource, where the carrier resource and the time and frequency resources are regarded as a dedicated scheduling request resource; and a notification unit 82 configured to notify the user equipment of the carrier resource and/or the time and frequency resources.

The dedicated scheduling request resource includes information on time and frequency resources of one uplink component carrier allocated to the user equipment at any moment of time.

The resource allocation unit 81 may include:

an uplink carrier choosing unit configured to choose one uplink component carrier for the user equipment as a carrier for a dedicated scheduling request of the user equipment according to the preset scheduling criterion;

a time and frequency configuration unit configured to set a subframe for the chosen uplink component carrier; and a PUCCH resource index determination unit configured to allocate on the chosen uplink component carrier to the user equipment a resource index of a PUCCH resource for the dedicated scheduling request.

The uplink carrier choosing unit is configured to determine uplink component carriers supported by the user equipment according to capability information reported from the user equipment, and choose randomly one of the uplink component carriers supported by the user equipment as a carrier for the dedicated scheduling request of the user equipment.

The uplink carrier choosing unit is configured to choose a primary carrier as a carrier for the dedicated scheduling request of the user equipment.

The uplink carrier choosing unit is configured to determine uplink component carriers supported by the user equipment according to capability information reported from the user equipment, and to choose one of the uplink component carriers supported by the user equipment as a carrier for the dedicated scheduling request of the user equipment according to a load balance criterion dependent upon information on loads of the uplink component carriers supported by the user equipment.

The resource allocation unit 81 may be configured to determine uplink component carriers supported by the user equipment according to capability information reported from the user equipment, choose more than one of the uplink component carriers supported by the user equipment, configure on each of the chosen uplink component carriers corresponding time and frequency resources on which the user equipment transmits the dedicated scheduling request and each of which corresponds to one of the uplink component carriers, and allocate a resource index of a PUCCH resource on each of the chosen uplink component carriers to the user equipment.

Figure 9:
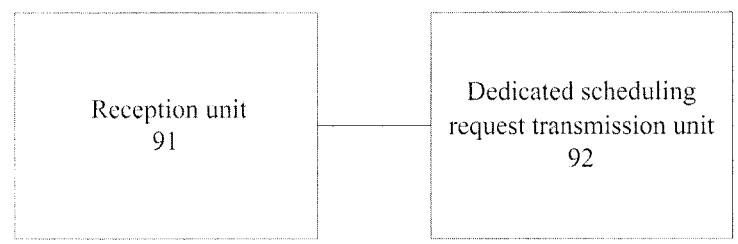
FIG. 9 is a schematic structural diagram of a user equipment according to an embodiment of the invention.

Referring to FIG. 9, a user equipment according to an embodiment of the invention includes:

a reception unit 91 configured to receive the carrier and time and frequency resources information used for transmitting the dedicated scheduling request resource; and a dedicated scheduling request transmission unit 92 configured to transmit a dedicated scheduling request on the time and frequency resources on the carrier designated by the base station.

The reception unit 91 is configured to receive an RRC signaling transmitted from the base station, which includes a frequency resource indication filed and a time and frequency resource indication filed. The frequency resource indication filed is used to store the D-SR resource index and the uplink carrier information for transmitting the dedicated scheduling request, and the time and frequency resource indication filed includes the period and subframe offset. And then the dedicated scheduling request transmission unit 92 is configured to determine the time and frequency resource as follows: the DSR resource starting subframe together with the period and offset can be used to deduce the time and frequency resource for dedicated scheduling request. Transmitting the dedicated resource index on the determined time and frequency resource of the carrier indicated in the frequency resource indication filed.

The reception unit 91 is configured to receive an RRC signaling transmitted from the base station, which includes a frequency-hopping mode indication field and a group of hop component carries indication field, where the group of hop component carriers indication field is used to store a group of hop component carriers of the user equipment, and the frequency-hopping mode indication field is used to store a relationship between a carrier and time for user of carriers in a frequency-hopping mode, and then the dedicated scheduling request transmission unit 92 is configured to transmit the dedicated scheduling request on the corresponding time and frequency resources on an uplink component carrier in the group of hop component carriers in the RRC signaling, and perform frequency-hopping in the time and frequency resources indicated in the frequency-hopping mode indication field.

In the embodiments of the invention, in a system supporting carrier aggregation, a carrier resource is chosen for a user equipment as a dedicated scheduling request resource of the user equipment according to a preset scheduling criterion, and time and frequency resources on the chosen uplink component carrier are designated for a dedicated scheduling request; and the user equipment is notified of the carrier resource and the time and frequency resources, thereby configuring a carrier and corresponding time and frequency resources on the carrier for a dedicated scheduling request of the user equipment in the system supporting carrier aggregation. Furthermore, a carrier resource may be chosen for the user equipment according to a variety of criteria, and only some general criteria have been listed in the foregoing embodiments. Of course, alternative criteria will not be precluded, e.g., the locations in frequency domain of uplink component carriers, or the bandwidths of uplink component carriers, which will not be enumerated here.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for allocating a dedicated scheduling request resource, comprising:
   allocating time and frequency resources on a primary carrier in a system supporting carrier aggregation for a user equipment, wherein the time and frequency resources are used for transmitting the dedicated scheduling request, and the time and frequency resources includes the PUCCH resource index, period, offset and the maximum number of transmissions that the dedicated scheduling request can be transmitted; and
   notifying the user equipment in an RRC signaling of the time and frequency resources information.

2. The method of claim 1, wherein allocating the time and frequency resources on the primary carrier further comprises:
   allocating at any time the time and frequency resources to the user equipment on the primary carrier.

3. A device for allocating a dedicated scheduling request resource, comprising:
   a resource allocation unit configured to allocate time and frequency resources on a primary carrier in a system supporting carrier aggregation for a user equipment, wherein the time and frequency resources are used for transmitting the dedicated scheduling request, and the time and frequency resources includes the PUCCH resource index, period, offset and the maximum number of transmissions that the dedicated scheduling request can be transmitted; and
   a notification unit configured to notify the user equipment in an RRC signaling of the time and frequency resources information.

4. The device of claim 3, wherein the resource allocation unit further configured to:
   allocate at any time the time and frequency resources to the user equipment on the primary carrier.

5. A method for transmitting a dedicated scheduling request, comprising:
   receiving, by a user equipment in a system supporting carrier aggregation, time and frequency resources information in an RRC signaling transmitted from a base station, wherein the time and frequency resources are used for transmitting the dedicated scheduling request, and the time and frequency resources includes the PUCCH resource index, period, offset and the maximum number of transmissions that the dedicated scheduling request can be transmitted; and
   transmitting a dedicated scheduling request on the time and frequency resources designated by the base station on a primary carrier.

6. The method of claim 5, wherein transmitting the dedicated scheduling request on the time and frequency resources designated by the base station on the primary carrier comprises:
   determining the time and frequency resources on which the dedicated scheduling request is transmitted according to the period and the offset in the time and frequency resource information and a preset starting subframe on which the dedicated scheduling request is transmitted; and
   transmitting the dedicated scheduling request on the determined time and frequency resources on the primary carrier.

7. A user equipment, comprising:
   a reception unit configured to receive time and frequency resources information in an RRC signaling transmitted from a base station, wherein the time and frequency resources are used for transmitting the dedicated scheduling request, and the time and frequency resources includes the PUCCH resource index, period, offset and the maximum number of transmissions that the dedicated scheduling request can be transmitted; and
   a dedicated scheduling request transmission unit configured to transmit a dedicated scheduling request on the time and frequencies resources designated by the base station on a primary carrier.

8. The user equipment of claim 7, wherein the dedicated scheduling request transmission unit is further configured to determine the time and frequency resources on which the dedicated scheduling request is transmitted according to the period and offset in the time and frequency resource information and a preset starting subframe on which the dedicated scheduling request resource is transmitted, and transmit the dedicated scheduling request on the determined time and frequency resources on the primary carrier.

* * * * *